W. W. BRAREN.
FLOUR SIFTER.
APPLICATION FILED AUG. 20, 1909.
1,028,322.
Patented June 4, 1912.
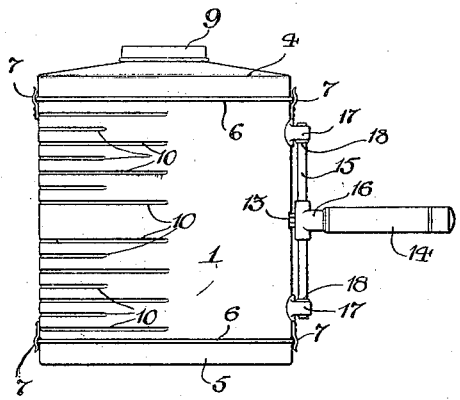
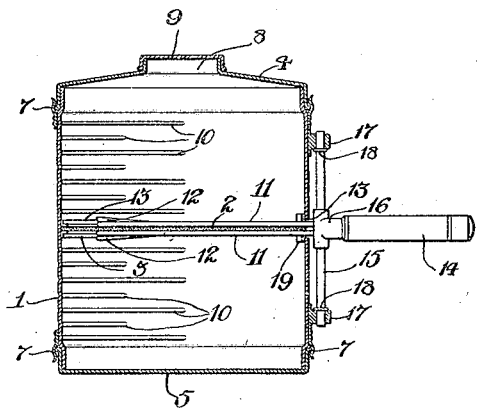
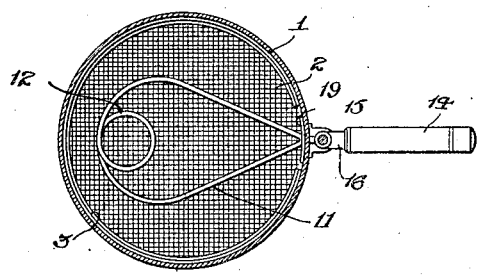
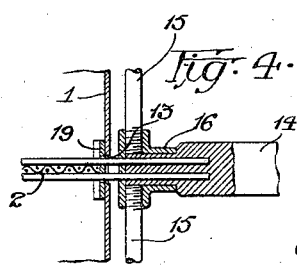
Witnesses:
Frank W. Brown
Hildur C. Petersen
Inventor:
Waldo W. Braren
by Peirce & Fisher
Attys.

UNITED STATES PATENT OFFICE.

WALDO W. BRAREN, OF CHICAGO, ILLINOIS.

FLOUR-SIFTER.

1,028,322.

Specification of Letters Patent. Patented June 4, 1912.

Application filed August 20, 1909. Serial No. 513,735.

*To all whom it may concern:*

Be it known that I, WALDO W. BRAREN, a citizen of the United States, and a resident of Chicago, county of Cook, and State of Illinois, have invented certain new and useful Improvements in Flour-Sifters, of which the following is a specification.

The invention relates to flour sifters and seeks to provide a simple and effective construction by which flour can be quickly and thoroughly sifted a number of times.

The invention consists in the features of improvement hereinafter set forth, illustrated in the accompanying drawings and more particularly pointed out in the appended claim.

In the drawings Figure 1 is a view in elevation of the improved sifter. Fig. 2 is a longitudinal section thereof. Fig. 3 is a cross section and Fig. 4 is an enlarged detail view illustrating the construction of the agitators and operating handle.

The improved sifter comprises an open-ended cylinder or receptacle 1 preferably formed of sheet metal and having a flat sieve 2 arranged midway between its ends and suitably secured to the wall of the receptacle, as by means of flanged rings 3. The end portions of the cylindrical receptacle 1 are slightly reduced and flanged covers 4 and 5 fit over these reduced ends, as shown. The flanges of these covers are provided with beaded edges 6 that are arranged to be engaged by spring clips 7 fixed to the outer wall of the receptacle 1 adjacent its ends. The covers 4 and 5 are thus securely held in position, but may be readily removed to fill or empty the sifter and easily returned to position to close the ends of the receptacle. To facilitate the discharge of the flour from the receptacle one of the covers 4 is preferably dished outwardly and is provided with a flanged discharge opening 8. This discharge opening is normally closed by a small supplemental flanged cover 9. The wall of the receptacle 1 is preferably provided with a series of marks 10, so that the flour to be sifted can be readily measured.

A pair of agitators 11 are arranged within the receptacle 1 on each side of the sieve 2. These agitators snugly embrace the sieve 2 between them and engage the opposite faces of the sieve 2. The agitators are preferably formed of wire loops, the central portions of which are bent to form small loops 12. The ends of the agitators extend through an opening 13 in the side wall of the receptacle and are socketed within the ends of a laterally and radially projecting handle 14 that is arranged in line with the agitators. This handle is preferably formed of wood and is centrally fixed at its inner end to a longitudinally extending shaft 15 that is journaled upon the side wall of the receptacle. In the form shown this shaft is formed of two sections which are threaded at their inner ends into a T-shaped coupling piece 16 that fits over the inner end of the handle 14. The shaft is arranged closely adjacent the outer face of the receptacle 1 and is journaled at its ends in suitable bearings 17 fixed to the outer ends of the receptacle 1 near its ends. Collars or shoulders 18 on the shaft engage the bearings 17 and hold the shaft in position. In assembling the parts the bearings are slipped over the ends of the shaft into engagement with the flanges or shoulders 18 and are then soldered, riveted or otherwise suitably secured to the outer face of the receptacle 1. To prevent the escape of flour through the opening 13, a short plate 19 fits loosely over the ends of the agitators 11, extends over the opening 13 and abuts against the inner face of the receptacle, as shown.

Flour can be placed in the receptacle upon either side of the sieve 2 and then, by grasping the handle 14 and shaking the sifter or swinging it from side to side, the flour will be quickly sifted through the sieve into the opposite end of the receptacle. The sifter can then be readily inverted and the flour can be again sifted through the sieve. The operation may be continued and the flour quickly sifted as many times as desired, and can also, if desired, be at the same time thoroughly mixed with baking powder, or the like. After it is sifted the flour can be discharged by removing one of the covers 4 or 5, or the small supplemental cover 9.

By means of the centrally arranged radially projecting handle 14 the sifter can be easily manipulated with one hand. The longitudinally extending shaft forms a secure connection between the handle and the body of the receptacle and also forms a strong bearing upon which the body of the receptacle is swung from side to side.

It is obvious that changes may be made in the details set forth without departure from the essentials of the invention, as defined in the claim.

I claim as my invention:—

A flour sifter, comprising a receptacle, a sieve therein, an agitator in proximity to said sieve and projecting through the wall of said receptacle, an exterior radial handle arranged in line with and fixed to said agitator, a longitudinally extending shaft arranged adjacent the wall of said receptacle and centrally fixed to the inner end of said handle, and bearings fixed to the outer face of said receptacle and engaging the ends of said shaft.

WALDO W. BRAREN.

Witnesses:
HARRY L. CLAPP,
ELEANOR HAGENOW.